United States Patent [19]
Goldstein

[11] 3,947,691
[45] Mar. 30, 1976

[54] OPTICAL EMBOSSING READER

[75] Inventor: Amnon Goldstein, Forest Hills, N.Y.

[73] Assignee: Decicom Systems, Inc., Farmingdale, N.Y.

[22] Filed: Dec. 26, 1973

[21] Appl. No.: 428,281

Related U.S. Application Data

[63] Continuation of Ser. No. 11,707, Feb. 16, 1970, abandoned.

[52] U.S. Cl........... 250/566; 250/227; 235/61.11 E; 235/61.7 B; 340/149 A
[51] Int. Cl.²........................................... G02B 5/14
[58] Field of Search............ 250/555, 556, 566–569, 250/227; 235/61.7 B, 61.11 E, 61.11 C; 356/71; 340/149 A, 146.3 AC

[56] References Cited
UNITED STATES PATENTS

| | | | |
|---|---|---|---|
| 3,430,055 | 2/1969 | Metzger | 250/224 |
| 3,600,591 | 8/1971 | Thier | 250/227 X |
| 3,629,835 | 12/1971 | Brown et al. | 235/61.11 E X |

OTHER PUBLICATIONS

Jackowski et al.: IBM Technical Disclosure Bulletin; Vol. 8; No. 9; Feb., 1966; pp. 1233, 1234.

*Primary Examiner*—Walter Stolwein
*Attorney, Agent, or Firm*—Blum, Moscovitz, Friedman & Kaplan

[57] ABSTRACT

An optical embossing reader wherein the presence of embossing at predetermined locations on a reflective plane surface is detected including means for illuminating a region of said predetermined location and light sensing means for receiving light originating from said illuminating means reflected from said reflective plane surface. The sensing means is positioned relative to the illuminating means and predetermined location for the gating by the embossing of the quantity of reflected light actually received by the sensing means if the predetermined location is embossed.

4 Claims, 5 Drawing Figures

OPTICAL EMBOSSING READER

This is a continuation of application Ser. No. 11,707, filed Feb. 16, 1970 now abandoned.

BACKGROUND OF THE INVENTION

This invention relates generally to an embossing reader of the type useful for detecting the presence of embossed indicia on identification and credit cards. Such credit cards have generally had at least an identifying number, and frequently the name and address of the card holder disposed thereon by means of embossed or raised numbers and letters of a particular font. The embossed information is utilized as a printing plate in specially designed printing apparatus to provide a permanent record of each transaction involving the card.

In addition to the above described embossed indicia, such identification in credit cards are frequently provided with a coded matrix of embossed bars or dashes which serve to identify and distinguish each particular card. In the art, devices have been utilized to "read" the coded matrix through the use of mechanical sensing fingers which enter the recess on the reverse face of the embossed bar to provide an indication of the presence of a bar at a particular matrix location. These reading devices require the additional coded matrix on the card, and in addition, are of quite complex construction and expensive.

With the widespread use of identification and credit cards, it is desirable to produce an efficient device for reading the identifying indicia on a credit card for transmission to a central location to confirm identification of the card, and to facilitate the instantaneous recording of the transaction involving the card, as the transaction is consummated. Thus, for example, it is contemplated that remote terminals will be provided at each commercial establishment or department in a single store connected to a central station and that each of said remote terminals will be adapted to receive a credit or identifying card, "read" the identifying indicia embossed on said card, and transmit the information to the central location for verification. In conjunction with such verification, an operator could also transmit through said terminal the information pertinent to the particular transaction, such as a sale of merchandise for crediting to the card holder's account at the central station. By providing an optical embossing reader capable of reading the embossed indicia directly, the above-described systems are facilitated, the special coding matrix on the card may be dispensed with, wear on the card during reading is minimized and a more efficient and less complicated "reading" device is provided.

SUMMARY OF THE INVENTION

Generally speaking, in accordance with the invention, an optical reader is provided for detecting whether a portion of a reflective surface at a predetermined location thereof is raised or recessed, and therefore disposed outside the plane thereof, as in embossing in a credit card. The device includes means for illuminating a region of the predetermined location and light sensing means for receiving light originating from said illuminating means reflected from said reflective plane surface. The sensing means is positioned relative to the illuminating means and predetermined location so that the embossed portion of the reflective surface at said predetermined location gates the quantity of such reflected light actually received by the light sensing means if said portion is embossed or disposed outside the plane of said surface. The sensing means is adapted to produce first and second characteristic output signals in response to the quantity of light received thereby, said signals being representative respectively of the presence or absence of embossing at said predetermined location.

If detection is to be achieved on the raised side of the embossing, the embossing at a predetermined location, if present, serves to limit the quantity of reflected light actually received by the sensing means. In such an embodiment, the sensing means and illuminating means are both positioned for spaced relation to the reflective plane surface and may be disposed either in spaced relation along the reflective plane surface for positioning in facing relation to said reflective plane surface at least in part on substantially opposed sides of the predetermined location or, in the alternative, with one of the illuminating means and light sensing means being positioned to substantially face the predetermined location, the other of said illuminating means and light sensing means being positioned to substantially face a region of said reflective plane surface other than said portion thereof.

When detection is to be achieved on the recessed side of the card, the illuminating means and light sensing means are positioned so as to be adjacent the reflective plane surface of said card for the passage of an increased quantity of reflected light if the predetermined location which may be embossed is recessed relative to the plane thereof. In such an embodiment, both illuminating means and light sensing means, at least in part, are positioned to face the predetermined location of said card which may be embossed.

In order to detect a particular embossed indicia, such as a numeral, a matrix of predetermined locations is examined by the above-described detecting arrangement, with at least one sensing device being associated with each location on said matrix. The output signals of each of said sensing means are applied to decoder means which produces an output signal associated with the detected indicia.

Accordingly, it is an object of this invention to provide a device for detecting whether a portion of a reflective plane surface at a predetermined location is disposed outside of the plane thereof.

Another object of the invention is to provide a device for detecting embossing at predetermined locations on a reflective plane surface through optical means and for producing a characteristic signal representative of the presence or absence of embossing at said predetermined locations.

A further object of the invention is to provide an embossed card reader wherein the presence of embossing at predetermined locations on a card serves to gate the quantity of light reflected from the surface of said card received by sensing means.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

Brief Description of the Drawings

For a fuller understanding of the invention, reference is had to the following description taken in connection with the accompanying drawings, in which:

FIG. 6 is an exploded view of another embodiment of the card of FIG. 1 showing an embodiment of an illuminating and sensing fiber optic matrix.

DESCRIPTION OF THE PREFERRED EMBODIMENTS

Figure 1:
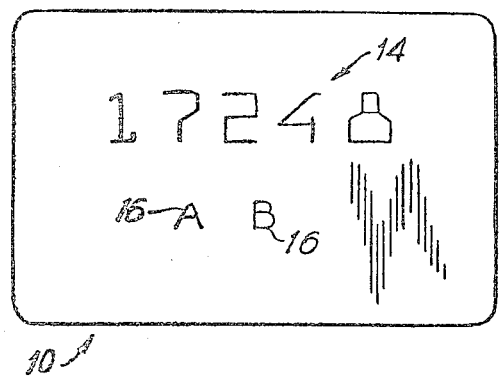
FIG. 1 is a plan view of an embossed credit card.

Referring now to FIG. 1, the credit or identifying card 10 depicted is preferably formed of a thin plate of a plastic material having a reflective plane surface 12 on the face thereof. Formed in said surface is an identifying number 14 formed by embossing the individual numerals in the card. Each embossed numeral projects upwardly from the plane of reflective surface 12 and is defined by a corresponding recess in the reverse surface of card 10. The numerals 14 in the embodiment of the card 10 shown in the drawing are in a particular font identified as number 1428E of the Dashew Business Machines, Inc. The card may also include other written indicia as at 16, including the name and address of the card holder.

Figure 2:
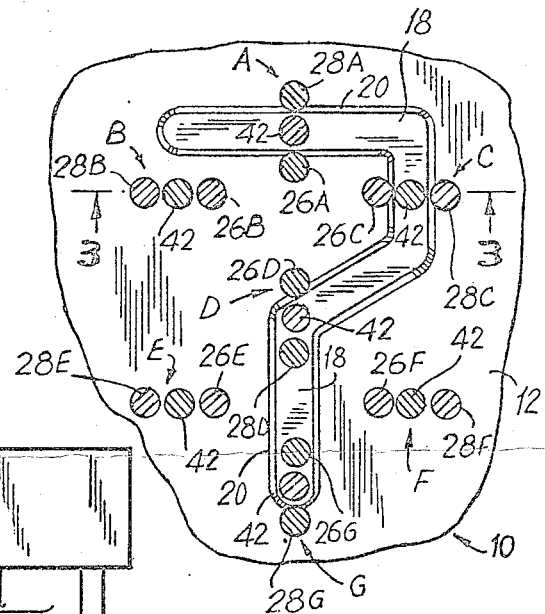
FIG. 2 is an exploded view of a portion of the credit card of FIG. 1 showing one embodiment of a fiber optic illuminating and sensing matrix according to the invention.
Figure 3:
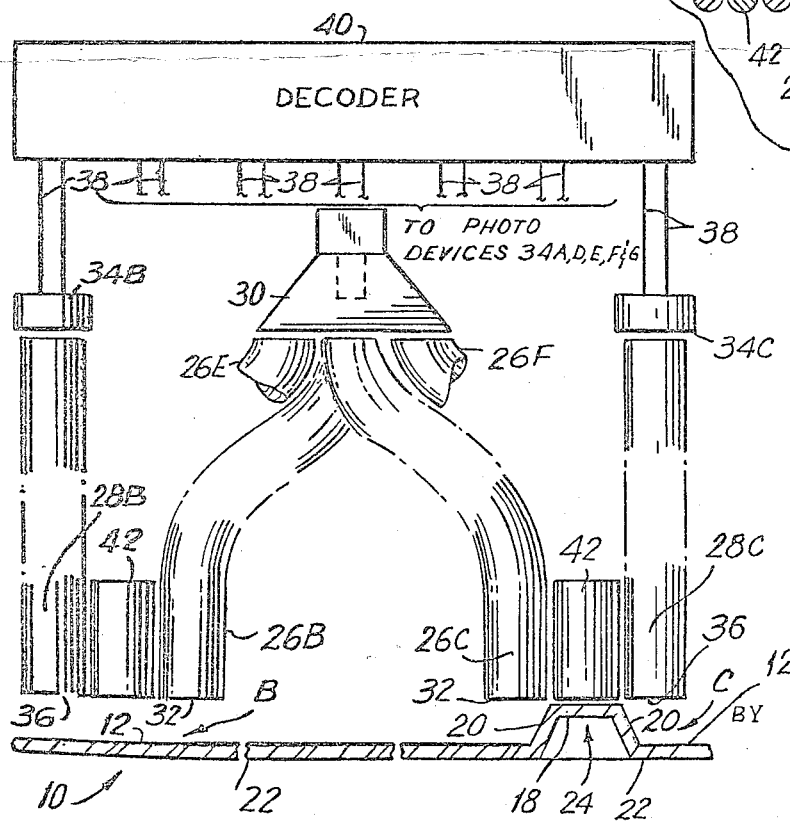
FIG. 3 is a sectional view taken along lines 3 — 3 of FIG. 2, showing schematically, portions of the optical embossing reader according to the invention.

Referring now to FIGS. 2 and 3, wherein the embossed numeral 7 of card 10 is more particularly shown, it is seen that each embossed numeral consists of a flattened portion 18 projecting from reflective surface 12 and joined to said surface by inclined walls 20. The reverse side of card 10 may also be provided with a reflective plane surface 22 in which the numeral is defined by a recess 24.

The fonts utilized on credit and identification cards are selected so that the various numbers from 0 to 9 may be distinguished from one another by merely examining a matrix of predetermined locations in the field occupied by each numeral. When drawn in the same field, each numeral from 0 to 9 in a particular font will occupy a different combination of predetermined locations in said matrix.

In the embodiment of the invention shown in FIG. 2, the selected matrix has seven positions, A, B, C, D, E, F, and G which are examined in accordance with the invention to determine the presence of embossing at such locations. Thus, in the example shown in FIG. 2, the numeral 7 crosses the 7 position matrix at four locations, locations A, C, D, and G. The numeral 2 of the same font would cross said matrix at positions A, C, D, E, and G, and in like manner, each of the other numerals from 0 to 9 would cross said matrix in a different combination of locations. While a seven position matrix is shown in the embodiment of FIG. 2, positions A and G may be dispensed with in detecting the particular font shown in said figure. The remaining five positions providing sufficient information for distinguishing between the different numerals.

Disposed at each position in said seven position array are the ends of illuminating light transmission fiber optic filaments 26A, B, . . . , G and reflected light transmission fiber optic elements 28A, B, . . . , G. Each of said fiber optic elements 26 and 28 may be formed from one or more fiber optic filaments and the ends thereof adjacent card 10 would be maintained in the desired matrix by a frame or potting material (not shown), as desired. All of the illuminating light transmission elements 26A, B, . . . , G, are bundled at the other end thereof and disposed with their ends facing lamp 30. Said illuminating light transmission fiber optic elements transmit the light from lamp 30 along their length so that the operative ends 32 thereof serve as a light source for illuminating regions of reflective surface 12 of card 10.

One end of each reflective light transmission element 28A, B, . . . , G, is disposed adjacent the operative face of a corresponding photo device 34A, B, . . . , G which serves to detect the light received at operative face 36 of elements 28 and transmitted therealong. Each photo sensitive device 34 is connected by leads 38 to a decoder 40 which receives the output signal of said photo devices and is adapted to produce a characteristic output signal representative of each numeral in response to the various combinations of input signals obtained along lines 38 from the photo devices. The output of decoder 40 may be utilized for transmission to a remote station, or to activate a display or recording device.

Interposed between each illuminating light transmitting element 26 and reflected light transmitting element 28 is a spacer 42, provided to maintain each pair of elements in the proper spaced relation as more particularly described below. The respective operative faces 32 and 36 of elements 26 and 28 are positioned so as to be spaced from reflective plane surface 12 of card 10. This arrangement permits light projected from operative face 32 of illuminating light transmission elements 26 to disperse sufficiently so that when said light is reflected from reflective plane surface 12, the reflected light will reach operative face 36 of reflected light transmission elements 28 in the absence of embossing at the predetermined location being examined. Thus, in the embodiment of FIGS. 2 and 3, there is no obstacle to the receipt, by reflected light transmission element 28B of light originating from illuminating light transmission element 26B and reflected from plane surface 12. However, in the C position of the matrix, the embossing serves to block substantially all of the light originating from illuminating light transmission element 26C so that little or no reflected light is received by reflected light transmission element 28C.

Since the signal produced by photo devices 34A, B, . . . , G, depends on the quantity of light detected thereby, photo device 34C will produce a first characteristic signal different from the characteristic signal produced by photocell 34B. If the numeral being scanned by the matrix had been the numeral 1 of the font shown in FIG. 1, then photo device 34C would have produced a second signal similar to the signal produced by photocell 34B in the example of FIG. 2 and FIG. 3.

Decoder 40 is adapted to detect the two different characteristic signals producible by each photo device, to distinguish between them, and thereby determine whether embossing was present at each particular location in the matrix. In effect, the presence of embossing at a particular matrix location serves to gate the quantity of light originating from the light source disposed at that particular matrix position and received by the photo device associated with said position. This result is facilitated by the positioning of the respective elements so that the operative ends thereof 32 and 36 substantially face opposed sides of the position on the card 10 at which embossing may appear.

Figure 4:
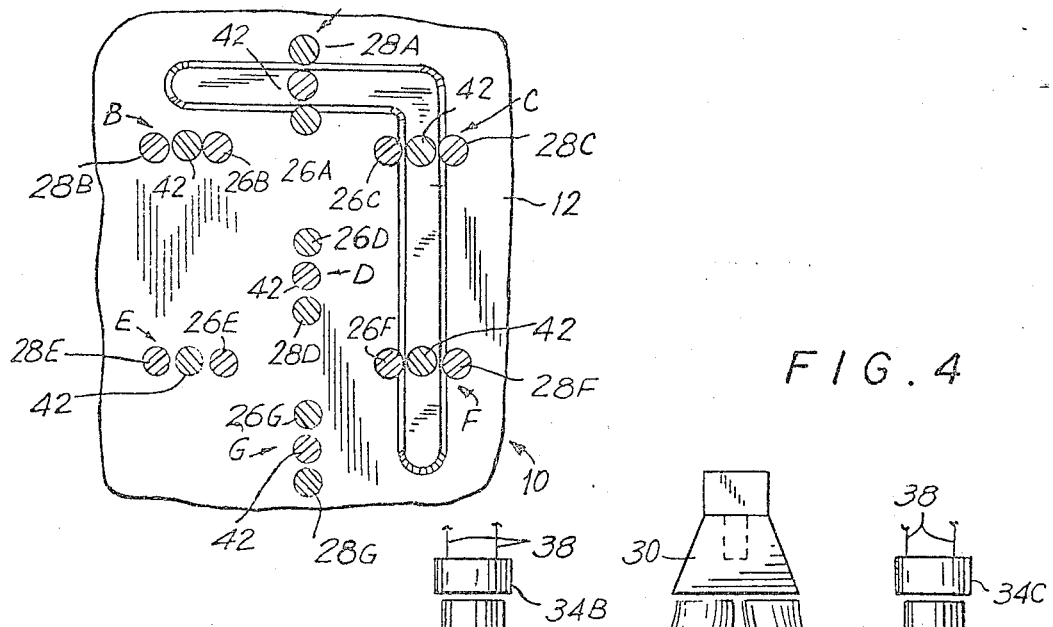
FIGS. 4 and 5 are sectional views of two further embodiments of the embossing reader according to the invention.

A second embodiment of the arrangement according to the invention is shown in FIG. 4 wherein like reference numerals are utilized to identify like elements. In this second embodiment, spacers 42 are dispensed with and reflected light transmission elements 44 are disposed with the operative face thereof 46 facing the position on the surface 12 of card 10 at which embossing may appear. Thus, operative face 46C faces portion 18 of the embossed numeral 7 rather than being disposed on a side of said portion as in the case of element 28C of the embodiment of FIGS. 2 and 3. Aside from the positioning of reflected light transmission element 44C, the embodiment of FIG. 4 operates in the same manner as the embodiment of FIGS. 2 and 3 in that the embossing at a particular position serves to gate the quantity of light reaching the reflected light transmission element disposed at that position by limiting the amount of light reaching said reflected light transmission element.

Figure 5:
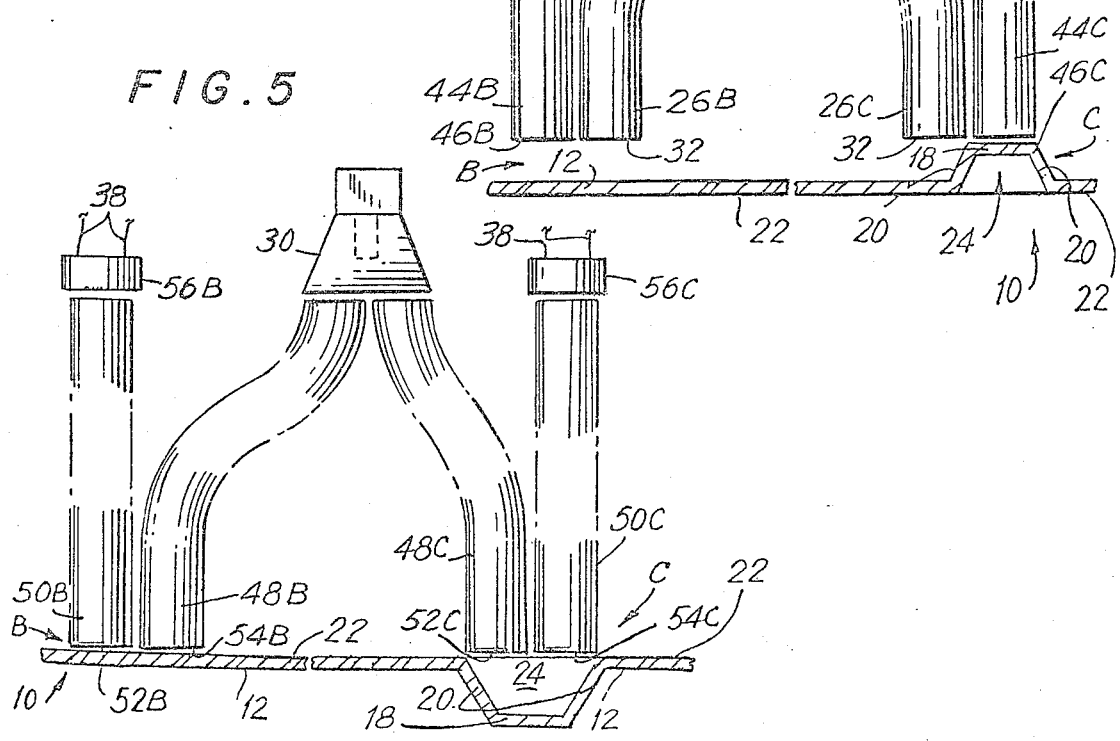

A third embodiment of the arrangement according to the invention is shown in FIG. 5, wherein like reference numerals are utilized to represent elements unchanged from the prior embodiment. The third embodiment is particularly adapted to scan reflective plane surface 22 of card 10 to detect the presence of embossing at predetermined locations by detecting the presence of a recess in said surface. As in the other embodiments, each position is provided with an illuminating light transmission element 48A, B, . . . , G, and a reflected light transmission element 50A, B, . . . , G. The respective operative faces 52 and 54 of said illuminating light transmission and reflected light transmission elements are positioned to face the position on surface 22 of card 10 at which embossing may appear. Thus, both operative faces 52C and 54C face recess 24. The respective elements are positioned so that said operative faces are adjacent the reflective plane surface 22. In the absence of a recess at a particular position in the matrix, little or no light originating from the illuminating light transmission element 48 to the reflected light transmission element at said position. However, as in the case of position C in FIG. 5, recess 24 permits the dispersion and reflection of light from illuminating light transmission element 48C and the receipt of said reflected light by reflected transmission element 50C. Thus, photo device 56C will detect a greater amount of light than photo device 56B and will produce a different characteristic signal representative of the presence of a recess, and therefore embossing, at position C, but no such recess or embossing at position B.

In a variation of the third embodiment, the illuminating and reflecting light transmission elements are aligned along the longitudinal axis of the embossing to be detected and facing the portion of surface 12 which may be embossed, rather than being aligned transverse to said axis as in the other embodiments. This variation would be equally applicable to the "reading" of both the raised and recessed sides of an embossed card, the only difference being that in "reading" the raised side, the elements would be spaced from the surface 12.

The arrangement according to the invention is not limited in application to the particular font shown in FIGS. 1 and 2. Thus, for example, FIG. 6 shows an exploded view of a reading matrix according to the invention disposed in position over the numeral 7 in another font, in this case a font designated by identification number 7B1 of the Farrington Manufacturing Co. By appropriate selection of the matrix, any numerical or alphabetical font, or other indicia embossed on an identification or credit card may be detected, provided each position in said matrix includes the illuminating and sensing arrangement according to the invention. The particular matrix depicted in FIGS. 1, 2 and 6 is shown by way of example, and not by way of limitation. Further, the arrangement according to the invention can be applied to the detection of any portion of a reflected plane surface disposed outside the plane thereof, and is not limited in its application to the detection of embossing. Further, the arrangement according to the invention can detect embossing or the like in reflective surfaces which are curved, by detecting whether a portion of such a surface is disposed outside of the tangential plane at said location.

While the embodiments shown in the drawings utilize separate light sources at each position in the matrix, two or more positions in said matrix may share a common light source so long as the reflected light transmission element is disposed, relative to the light source and the position which may be embossed, so that embossing at said position serves to gate the light reaching the reflected light transmission element. Further, while the embodiments of the arrangement according to the invention shown in the drawing utilize fiber optic elements in the light source and sensing means, such use is not a limitation of the invention and other properly disposed light sources and sensing means may be utilized.

The foregoing arrangement permits the reading of embossed indicia of relatively complex shape, such as numerals and letters, an arrangement extremely difficult to produce with mechanical sensing devices. Further, the arrangement according to the invention utilizes a minimum number of components to achieve reading and provides reliability and accuracy unavailable in purely mechanical arrangements.

It will thus be seen that the objects set forth above, among those made apparent from the preceding description, are efficiently attained, and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:
1. A device for detecting an embossment projecting from a portion of a reflective surface at a predetermined location on said surface comprising means for illuminating a region of said predetermined location including a first light transmitting fiber optic element having an illuminating end face; light sensing means for receiving light originating from said illuminating means reflected from said reflective surface including a sec- ond light transmitting fiber optic element having a sensing end face; and means for positioning said sensing means relative to said illuminating means and predetermined location for the limiting, by said portion of said reflective surface, of the quantity of such reflected light actually received by said sensing means if said portion projects beyond said surface, said positioning means positioning said reflective surface so that said illuminating end face and said sensing end face are both positioned spaced relative to said reflective surface a distance slightly greater than the projection of said embossed portion, and so that one of said illuminating or sensing end faces is positioned for facing relation to a region of said reflective surface on one side of said portion thereof, the other of said illuminating or sensing end faces being positioned in facing relation to said portion of said reflective surface or to a region of said reflective surface on a side of said portion substantially opposed to said one side thereof, so that light from said illuminating end face and reflected from said reflective surface is cut off from said sensing end face by an intervening embossment at said portion of said reflective surface, said sensing means producing first and second characteristic output signals in response to the quantity of light received thereby, said signals being representative respectively of the presence or absence of an embossment at said portion of said reflective surface.

2. A device as recited in claim 1, including means for detecting embossing in a plurality of predetermined portions of said reflective surface at a matrix of predetermined locations, said detecting means including at least one of said illuminating means having a plurality of said first light transmitting fiber optic elements for respectively illuminating the regions of said matrix at predetermined locations; a plurality of said second light transmitting fiber optic elements, each of the sensing end faces thereof receiving light originating from said illuminating means reflected from one of said predetermined locations; and means for positioning said illuminating end faces, sensing end faces and reflective surface so that each of said illuminating end faces is positioned for facing relation to a region of said reflective surface on one side of the portion of said reflective surface at each of said predetermined locations, and so that each of said sensing end faces is positioned in facing relation to the portion of said reflective surface at the associated predetermined location or to a region of said reflective surface on a side of said portion substantially opposed to the side of said portion faced by said corresponding illuminating end face so that light from each said illuminating end faces and reflected from the associated region of said reflective surface is cut off from the associated sensing end face by an intervening embossment at the associated portion off said reflective surface.

3. A device for detecting an embossment recessed below a portion of a reflective surface at a predetermined location on said surface comprising means for illuminating a region of said predetermined location including a first light transmitting fiber optic element having an illuminating end face; light sensing means for receiving light originating from said illuminating means reflected from said reflective surface including a second light transmitting fiber optic element having a sensing end face; and means for positioning said sensing end face relative to said illuminating end face and predetermined location for the passage of an increased quantity of said reflected light to said sensing end face if said portion is recessed relative to said surface, said positioning means positioning both said illuminating and sensing end faces so as to be slightly spaced from the plane of said reflective surface, in facing relation to non-overlapping adjacent regions of said embossed portion of said reflective surface, so that light from said illuminating end face and reflected from said reflective surface is cut off from said sensing end face by the intervening reflective surface in the absence of a recessed embossment in said portion of said reflective surface, said sensing means producing first and second characteristic output signals in response to the quantity of light received thereby, said signals being representative respectively of the presence or absence of a recessed embossment at said portion of said reflective surface.

4. A device as recited in claim 3, wherein said reflective surface is a plane surface.

* * * * *